United States Patent

[11] 3,596,532

| [72] | Inventor | Karl Wilfert |
| | | Gerlingen-Waldstadt, Germany |
| [21] | Appl. No. | 817,326 |
| [22] | Filed | Apr. 18, 1969 |
| [45] | Patented | Aug. 3, 1971 |
| [73] | Assignee | Daimler-Benz Aktiengesellschaft |
| | | Stuttgart-Unterturkheim, Germany |
| [32] | Priority | Apr. 18, 1968 |
| [33] | | Germany |
| [31] | | P 17 55 247.5 |

[54] SAFETY STEERING WHEEL FOR MOTOR VEHICLES
4 Claims, 4 Drawing Figs.

| [52] | U.S. Cl. | 74/552 |
| [51] | Int. Cl. | B62d 1/04 |
| [50] | Field of Search | 74/552 |

[56] References Cited

UNITED STATES PATENTS

| 3,055,231 | 9/1962 | Daniel | 74/552 |
| 3,274,851 | 9/1966 | Geller | 74/552 |
| 3,285,091 | 11/1966 | Fiala | 74/552 |
| 3,364,785 | 1/1968 | Geller | 74/552 |
| 3,483,770 | 12/1969 | Eibl et al. | 74/552 |
| 3,493,244 | 2/1970 | Bozich | 74/552 X |

FOREIGN PATENTS

| 1,000,452 | 8/1965 | Great Britain | 74/552 |

*Primary Examiner*—William F. O'Dea
*Assistant Examiner*—F. D. Shoemaker
*Attorney*—Craig, Antonelli & Hill ABSTRACT: A safety steering wheel for motor vehicles in which the steering wheel rim, the steering wheel spokes and the hub as well as the deformation member are surrounded with a relatively soft elastic synthetic resinous material and in which a large impact surface is provided on the inside of the steering wheel rim which preferably does not extend significantly below the plane of the steering wheel rim; the steering wheel spokes are elastic and may be made, for example, of band steel.

INVENTOR
KARL WILFERT

ATTORNEYS

SAFETY STEERING WHEEL FOR MOTOR VEHICLES

The present invention relates to a safety steering wheel for motor vehicles which contributes to a considerable extent to the protection of the driver during accidents by a combination of a number of characteristic features.

In recent times, numerous proposals have been made in order to make more safe the steering wheels of motor vehicles. However, the prior art proposals are generally concerned only with certain parts such as, for example, the construction of the steering wheel spokes or the arrangement of a deformation member between steering spindle and steering wheel. The the present invention therefore aims at creating a safety steering wheel for motor vehicles, in part based on already known proposals, which in all of its parts is so constructed that the injury danger is kept as small as possible in case of impacts of the driver against the steering wheel caused by accidents.

Accordingly, a safety steering wheel for motor vehicles is proposed which, according to the present invention, is characterized by the combination of the following measures, known already in part, per se:

a. A deformation member of as great a height as possible is arranged between the end of the steering spindle and the top side of the steering wheel facing the driver.

b. The steering wheel rim, the elastic steering wheel spokes and the hub as well as the deformation member are foamed about, i.e., are surrounded by a foamed material made from soft, elastic synthetic resinous material of any known type.

c. Within the steering wheel rim as large as possible an impact surface is arranged which preferably does not extend substantially below the plane of the steering wheel rim.

According to a preferred type of construction of the present invention, the spokes of the proposed safety steering wheel consist of band steel.

By such a yielding construction of the spokes is achieved that in case of accidents, the upper body of the driver comes into abutment with certainty against the entire impact surface.

A further feature of the present invention resides in that an equally deformable insert is arranged inside the deformation member which is, for example, star-shaped in plan view.

With a multistep deformation member, such an insert may be arranged in each step.

The inserts may thereby consist, for example, of metal mesh or apertured sheet metal.

The arrangement of such types of inserts within the deformation member entails the advantage that the force necessary for the compression of the deformation member and the course or progress thereof with constant wall thickness of the deformation member can be far-reachingly changed and thus can be adapted to different requirements.

A change of the force necessary for the compression of the deformation member, however, can also be achieved in that the walls thereof are provided with suitable apertures or openings.

Finally, it may be advantageous if also the interior space of the deformation member is filled with foamed material.

Accordingly, it is an object of the present invention to provide a safety steering wheel for motor vehicles which avoids by simple means the aforementioned shortcomings and drawbacks encountered in the prior art.

Another object of the present invention resides in a safety steering wheel for motor vehicles which is simple in construction, can be easily manufactured and assembled and increases the protection afforded to the drivers.

A further object of the present invention resides in a safety steering wheel for motor vehicles which is so constructed and arranged that the injury danger is kept as small as possible in case of impacts of the driver against the steering wheel, caused by accidents.

Still a further object of the present invention resides in a safety steering wheel in which abutment of the upper body of the driver against the entire impact surface of the steering wheel is assured.

Another object of the present invention resides in a safety steering wheel in which the force necessary for the compression of the deformation member can be far-reachingly changed notwithstanding a constant wall thickness throughout on the part of the deformation member.

A still further object of the present invention resides in a safety steering wheel which is so constructed and arranged that most of the parts involved in absorbing the forces during an impact of the upper body of the driver can be readily embedded in and/or filled with foam material.

These and other objects, features, and advantages of the present invention will become more obvious from the following description when taken in connection with the accompanying drawing which shows, for purposes of illustration only, two embodiments in accordance with the present invention, and wherein.

Figure 1:
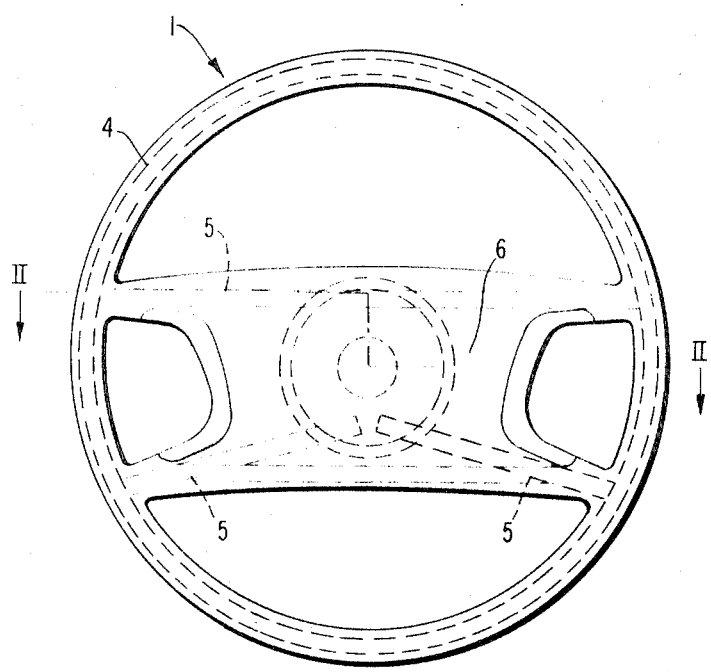
FIG. 1 is a top plan view on a steering wheel in accordance with the present invention.
Figure 2:
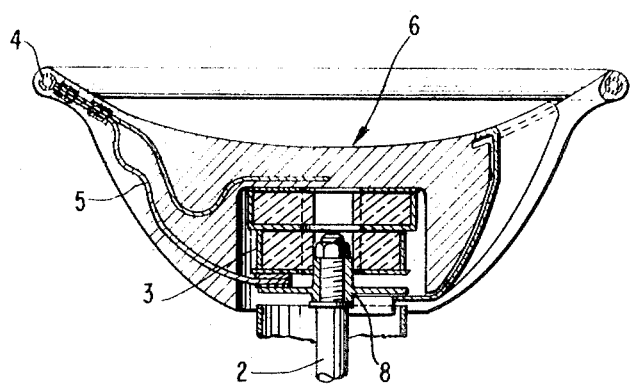
FIG. 2 is a cross-sectional view taken along line II–II of FIG. 1.

Referring now to the drawing wherein like reference numerals are used throughout the various views to designate like parts, and more particularly to FIGS. 1 and 2, reference numeral 1 generally designates the steering wheel, on the inside of which is arranged a two-step deformation member 3 secured on the steering spindle 2 by way of a hub 8. The steering wheel rim 4, the spokes 5 consisting of band steel and the deformation member 3 are foamed about with a soft elastic synthetic resinous material of any known, appropriate type, i.e., are surrounded by such foamed plastic material.

The impact surface generally designated by reference numeral 6 and formed essentially by the elastic synthetic resinous material is not disposed substantially lower than the steering wheel rim 4 and is practically drawn up to the same by the spokes 5.

Figure 3:
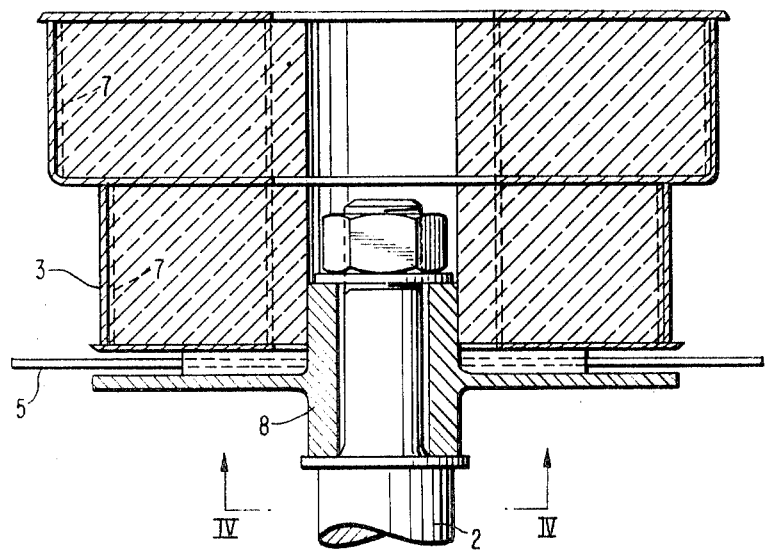
FIG. 3 is an axial cross-sectional view through a two-step deformation member provided with aligned inserts in accordance with the present invention.
Figure 4:
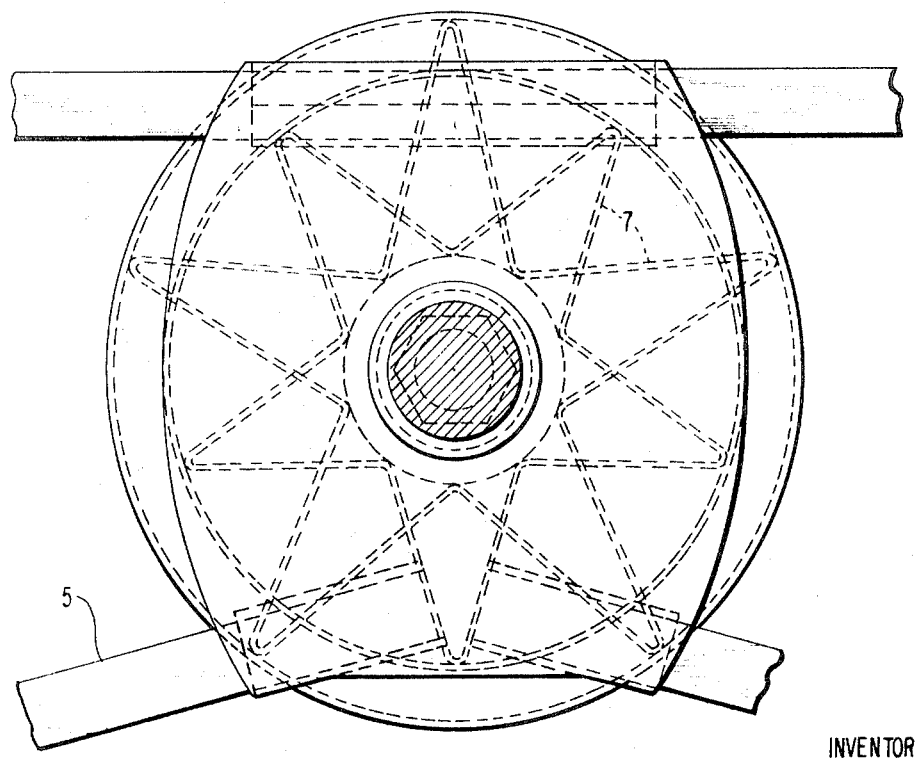
FIG. 4 is a bottom plan view on the deformation member of FIG. 3 except with the inserts staggered, taken along line IV–IV and looking in the direction of arrows IV–IV.

The two-step deformation member 3, illustrated on an enlarged scale in FIGS. 3 and 4, is provided with two, also deformable inserts 7 which are star-shaped as viewed in plan view.

The walls of the deformation member 3 may be provided with apertures or suitable openings arranged in any desired manner to adapt the force necessary for the compression thereof to the prerequisites of a particular situation. Additionally, the interior space of the deformation member 3, either with or without inserts may also be filled with foamed synthetic resinous material of any appropriate known type. Furthermore, the inserts 7 may consist of metal mesh or suitably apertured sheet metal elements to provide the desired characteristics.

While I have shown and described only two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A safety steering wheel for motor vehicles, comprising a steering wheel rim, a hub being operatively connected with a steering spindle, elastic steering wheel spoke means consisting of band steel operatively associated with the steering wheel rim and the steering spindle, deformation means being operatively arranged between the end of the steering spindle and the top side of the steering wheel facing the driver, said steering wheel rim, said steering wheel spoke means, said hub and said deformation means being surrounded with relatively soft, elastic, foamed synthetic resinous material, an impact surface provided within the steering wheel rim, which surface does not extend substantially below the plane of the steering wheel rim, and at least one deformable insert means being provided on the inside of the deformation means, wherein said insert means is substantially star-shape as viewed in plan view.

2. A safety steering wheel according to claim 1, wherein said deformation means is of multistep construction, characterized in that a deformable insert means is provided in each step.

3. A safety steering wheel according to claim 2, characterized in that also the interior space of the deformation means is provided with foamed synthetic resinous material.

4. A safety steering wheel according to claim 1, characterized in that also the interior space of the deformation means is provided with foamed synthetic resinous material.